United States Patent
Rausch et al.

(10) Patent No.: US 8,873,350 B2
(45) Date of Patent: Oct. 28, 2014

(54) HEAT ASSISTED MEDIA RECORDING APPARATUS WITH COMPENSATING HEATER

(71) Applicant: Seagate Technology LLC, Cupertino, CA (US)

(72) Inventors: Tim Rausch, Farmington, MN (US); Kenneth Ray Burns, Cannon Falls, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/889,518

(22) Filed: May 8, 2013

(65) Prior Publication Data

US 2014/0029397 A1 Jan. 30, 2014

Related U.S. Application Data

(60) Provisional application No. 61/676,831, filed on Jul. 27, 2012.

(51) Int. Cl.
*G11B 11/00* (2006.01)
*G11B 5/60* (2006.01)
*B65D 77/22* (2006.01)

(52) U.S. Cl.
CPC ............. *G11B 5/6088* (2013.01); *B65D 77/22* (2013.01)
USPC ................. 369/13.33; 369/13.13; 369/112.27

(58) Field of Classification Search
USPC .......... 369/13.33, 13.32, 13.24, 13.14, 13.03, 369/13.02, 13.12, 13.13, 13.22, 112.27
See application file for complete search history.

(56) References Cited

U.S. PATENT DOCUMENTS

| | | | |
|---|---|---|---|
| 7,995,425 B2 * | 8/2011 | Schreck et al. | 369/13.13 |
| 8,077,418 B1 * | 12/2011 | Hu et al. | 360/59 |
| 8,169,731 B2 * | 5/2012 | Mizuno et al. | 360/59 |
| 8,675,455 B1 * | 3/2014 | Krichevsky et al. | 369/13.24 |
| 2004/0027728 A1 | 2/2004 | Coffey et al. | |
| 2012/0201108 A1 * | 8/2012 | Zheng et al. | 369/13.26 |

* cited by examiner

*Primary Examiner* — Ali Neyzari
(74) *Attorney, Agent, or Firm* — Hollingsworth Davis, LLC

(57) ABSTRACT

An apparatus includes an optical pathway configured to deliver energy to heat a magnetic recording medium via a slider body. The optical pathway generates heat in the slider body when delivering energy to the magnetic recording medium. The apparatus includes a compensating heater with a thermal characteristic that matches a thermal characteristic of the optical pathway. The compensating heater is activated at least part of the time when the optical pathway is not delivering the energy to the magnetic recording medium.

18 Claims, 7 Drawing Sheets

HEAT ASSISTED MEDIA RECORDING APPARATUS WITH COMPENSATING HEATER

CROSS REFERENCE TO RELATED CASES

This application claims the benefit of Provisional Patent Application Ser. No. 61/676,831 filed on Jul. 27, 2012, to which priority is claimed pursuant to 35 U.S.C. §119(e) and which is hereby incorporated herein by reference in its entirety.

SUMMARY

Examples described herein are directed to a heat-assisted media recording device. In one embodiment, an apparatus includes an optical pathway configured to deliver energy to heat a magnetic recording medium via a slider body. The optical pathway generates heat in the slider body when delivering energy to the magnetic recording medium. The apparatus includes a compensating heater with a thermal characteristic that matches a thermal characteristic of the optical pathway. The compensating heater is activated at least part of the time when the optical pathway is not delivering the energy to the magnetic recording medium.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

This disclosure describes use of compensating heaters in heat-assisted magnetic recording (HAMR) devices. In HAMR devices, also sometimes referred to as thermal-assisted magnetic recording (TAMR) devices or energy assisted magnetic recording (EAMR), a magnetic recording medium (e.g., hard drive disk) is able to overcome superparamagnetic effects that limit the areal data density of typical magnetic media. In a HAMR recording device, information bits are recorded on a storage layer at elevated temperatures. The heated area in the storage layer determines the data bit dimension, and linear recording density is determined by the magnetic transitions between the data bits.

In order to achieve desired data density, a HAMR recording head (e.g., slider) includes optical components that direct light from a laser to the recording media. The HAMR media hotspot may need to be smaller than a half-wavelength of light available from current sources (e.g., laser diodes). Due to what is known as the diffraction limit, optical components cannot focus the light at this scale. One way to achieve tiny confined hot spots is to use an optical near-field transducer (NFT), such as a plasmonic optical antenna. The NFT is designed to support local surface-plasmon at a designed light wavelength. At resonance, high electric field surrounds the NFT due to the collective oscillation of electrons in the metal. Part of the field will tunnel into a storage medium and get absorbed, raising the temperature of the medium locally for recording. During recording, a write element (e.g., write pole) applies a magnetic field to the heated portion of the medium. The heat lowers the magnetic coercivity of the media, allowing the applied field to change the magnetic orientation of heated portion. The magnetic orientation of the heated portion determines whether a one or a zero is recorded. By varying the magnetic field applied to the magnetic recording medium while it is moving, data is encoded onto the medium.

Figure 1A:
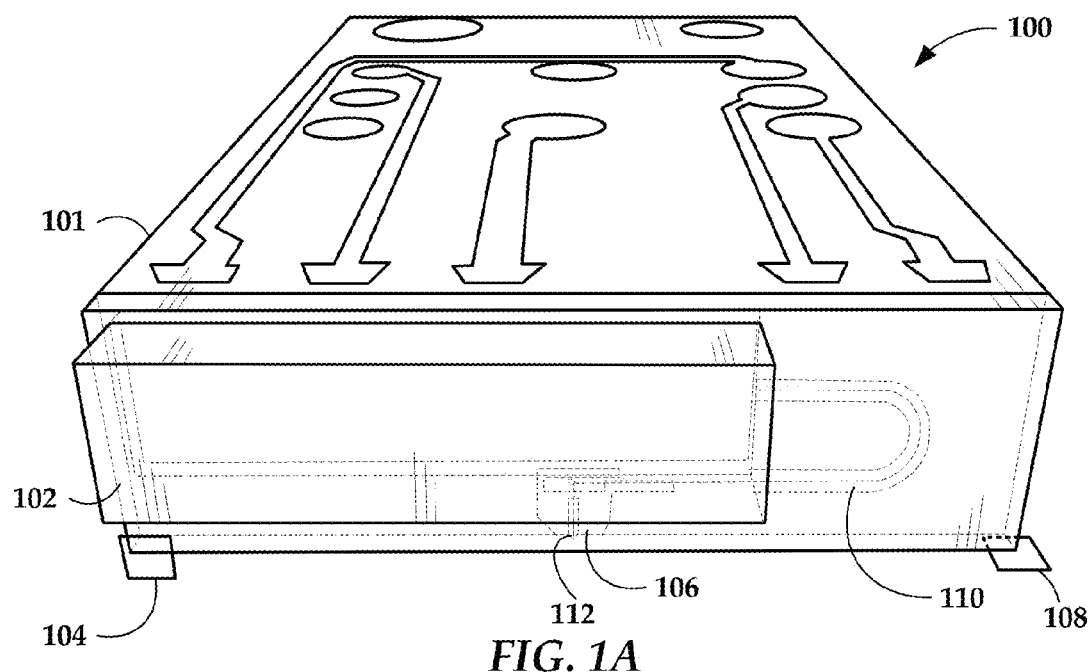
FIGS. 1A and 1B are perspective views of sliders according to example embodiments.

A HAMR drive uses a laser to heat the media to aid in the recording process. Due to inefficiencies of the optical transmission path, the laser also heats the head/slider. To illustrate possible optical transmission paths, FIGS. 1 and 2 show perspective views of HAMR configurations according to example embodiments. In FIG. 1A, slider 100 is a laser-in-slider (LIS) configuration. In this configuration, slider 100 includes body 101 having an edge-emitting laser diode 102 integrated into a trailing edge surface 104 of the slider body 101. In this example, the laser diode 102 is disposed within a cavity formed in the trailing edge surface 104. The laser diode 102 is proximate to a HAMR read/write element 106, which has one edge on an air bearing surface 108 of the slider 100. The air bearing surface 108 faces and is held proximate to a moving media surface (not shown) during device operation.

While here the read/write element 106 is shown as a single unit, this type of device may have a physically and electrically separate read element (e.g., magnetoresistive stack) and write element (e.g., a write coil and pole) that are located in the same general region of the slider 100. The separate read and write portion of the read/write element 106 may be separately controlled (e.g., having different signal lines, different head-to-media spacing control elements, etc.) although may share some common elements (e.g., common signal return path). It will be understood that the concepts described herein described relative to the read/write element 106 may be applicable to individual read or write portions thereof, and may be also applicable where multiple ones of the read write portions are used, e.g., two or more read elements, two or more write elements, etc.

The laser diode 102 provides electromagnetic energy to heat the media surface at a point near to the read/write element 106. Optical pathway components, such as a waveguide 110, are formed integrally within the slider device 100 to deliver light from the laser 102 to the media. In particular, a local waveguide and NFT 112 may be located proximate the read/write element 106 to provide local heating of the media during write operations. These components 106, 110, 112 may also experience significant heating from the laser 102 due to coupling and transmission inefficiencies.

Figure 1B:
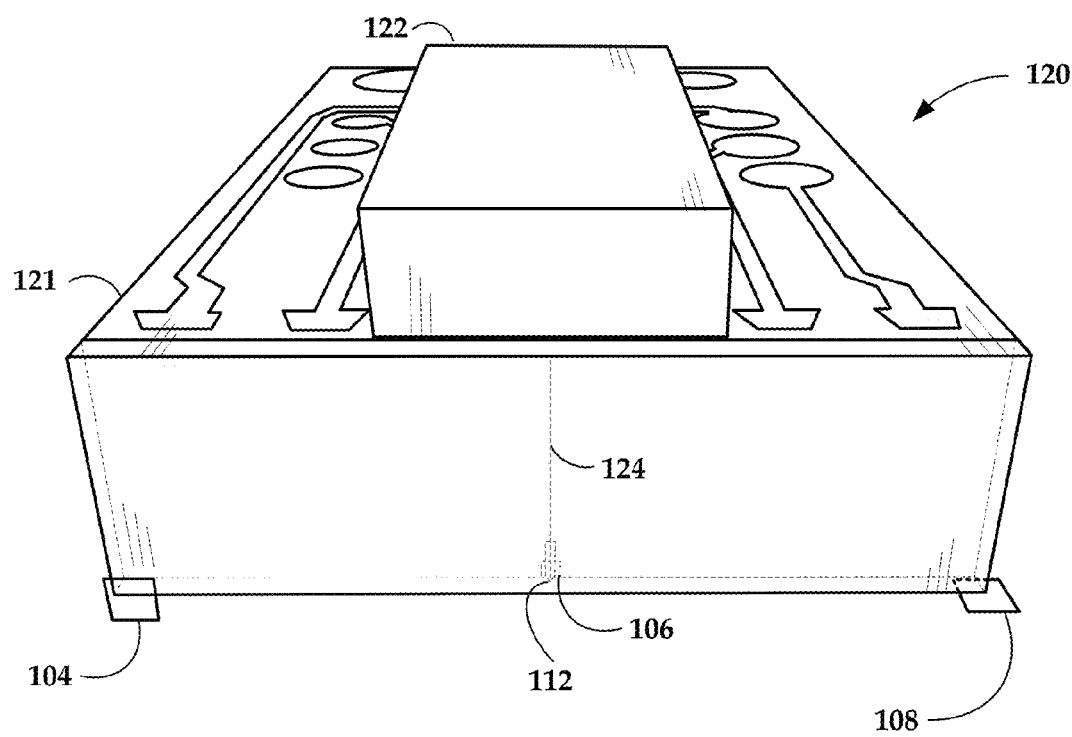
Figure 2:
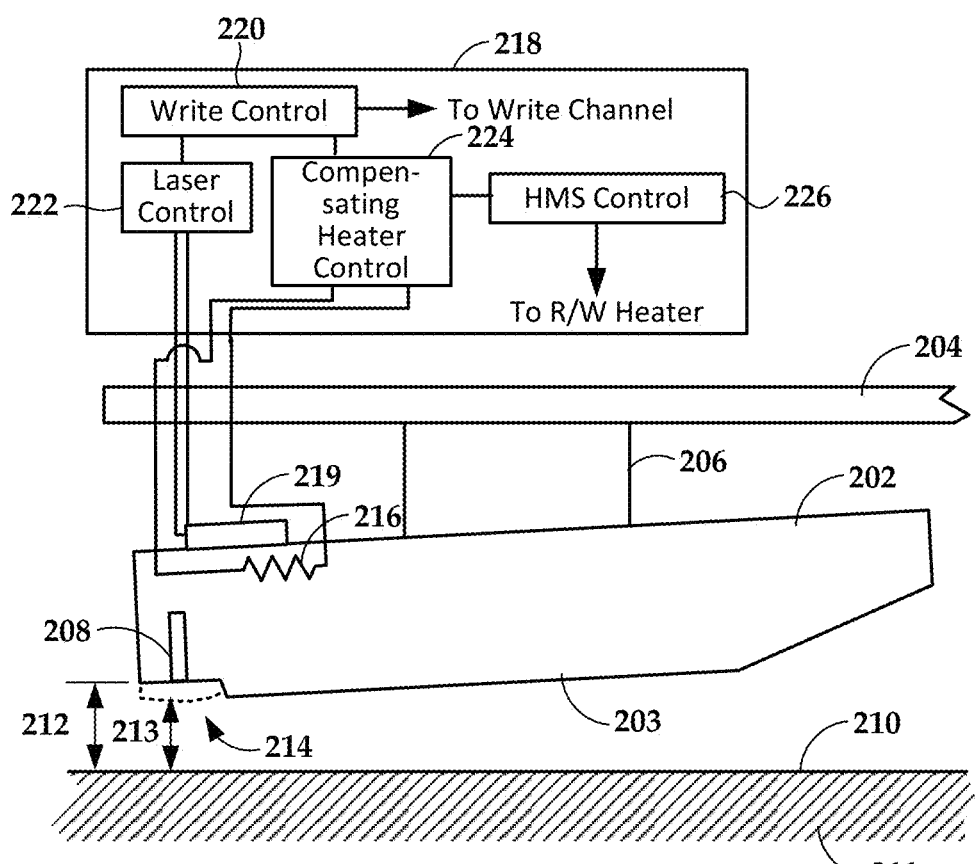
FIG. 2 is a side view of a slider according to an example embodiment.

In FIG. 1B, a laser-on-slider (LOS) configuration 120 is illustrated. This example includes a laser diode 122 that is mounted on a top surface of a slider body 121 The laser 122 is coupled to an optical pathway of the slider body 121 that includes, among other things, a straight waveguide 124. In this configuration, the laser 122 may also be edge-emitting, such that the light is emitted from the laser 122 in a direction normal to the trailing edge surface 104. In order to direct the light towards the air bearing surface 108, the laser 122 (or other component) may include optical pathway elements such as a mirror (not shown) that redirects the light emitted from the laser 122 towards the air bearing surface 108. In other configurations, an edge-emitting, top-mounted laser may be oriented so that the light emitted directly downwards toward the air-bearing surface 108. This may involve placing the laser on a submount (not shown) on the top of the slider body 121, the submount orienting the laser output in the desired direction.

While other components shown in FIG. 1B, such as the NFT 112 and read/write element 106 are referenced using the same numbers as FIG. 1A, the physical configuration of these and other components may differ in the different slider arrangements, e.g., due to the differences in optical coupling pathways, materials, laser power, etc. However, similar to the configuration shown in FIG. 1A, components 106, 112, 124 shown in FIG. 1B may also experience heating from the laser 102 due to coupling and transmission inefficiencies.

While not illustrated in FIGS. 1A and 1B, other slider configurations may utilize different types of lasers, such as vertical cavity emitting lasers. Other slider configurations may use free space light delivery, wherein light is coupled to the slider from an external laser. A free-space light delivery configuration may not experience direct heating from laser itself, but the optical pathway components that propagate the light may experience similar heating. The embodiments described below may be applicable to any of these energy delivery configurations.

The optical pathway heating in these examples can be localized at the NFT, the light delivery optics and/or at the laser itself. Light absorbed in these components is converted to heat, which is conducted to the surrounding materials. This heating causes thermal expansion, which can lead to head-media spacing (HMS) changes. For example, heat-induced expansion can change the shape of the slider and changing the air bearing characteristics, which can cause the writer to fly closer to the disk. An example of this is shown in FIG. 2, which illustrates a side view of a slider 202 according to an example embodiment.

The slider 202 is coupled to an arm 204 by way of a suspension 206 (e.g., gimbal) that allows some relative motion between the slider 202 and arm 204. The slider 202 includes read/write elements 208 (e.g., transducers) at a trailing edge that are held proximate to a surface 210 of a magnetic recording medium, e.g., disk 211. When the slider 202 is located over surface 210 of disk 211, a flying height 212 is maintained between the slider 202 and the surface 210 by a downward force of arm 204. This downward force is counterbalanced by an air cushion that exists between the surface 210 and an air bearing surface 203 of the slider 202 when the disk 211 is rotating.

It is desirable to maintain a predetermined slider flying height 212 over a range of disk rotational speeds during both reading and writing operations to ensure consistent performance. A region 214 is a "close point" of the slider 202, which is generally understood to be the closest point of contact between the slider 202 and the magnetic recording medium 211, and generally defines the HMS 213. As described above, heating from HAMR optical components can affect the HMS 213. This is shown in FIG. 2 by dotted line that represents a change in geometry of the region 214. In this example, the geometry change may be induced, in whole or in part, by an increase or decrease in temperature of the region 214 due to different thermal expansion properties of the respective materials surrounding the region.

In various embodiments described below, the slider 202 may include one or more heaters 216 that are designed to compensate for HAMR heating effects. The heater 216 may be positioned close to a heat-generating component, e.g., a top mounted laser 219 as shown here. A controller 218 can be coupled to the heater 216 to control when the heater 216 is switched on, and optionally to control an amount of power applied to the heater 216.

The controller 218 includes a write control module 220 that controls various aspects of the device during write operations. For a HAMR device, writing involves activating the laser 219 while writing to the media, which is indicated by way of laser control module 222. The laser control module 222 includes circuitry that switches the laser 219 on and off, e.g., in response to a command from write control module 220. A compensating heater control 224 switches heater 216 on and off inversely to the laser 219 to minimalize thermal changes within the slider 202 when the laser 219 is switched on and off.

The slider 202 may also include other heaters (not shown) that actively control HMS 213 during device operation, as indicated by HMS control module 226. The other heaters may be associated with one or both of the read/write elements 208. The HMS control module actively adjusts HMS 213 during respective read and write operations. The activities of the HMS control module 226 may be coordinated with the compensating heater control module 224. For example, a magnitude of signals sent from the compensating heater control 224 may be modified so as to complement (or at least not interfere with) HMS heating operations.

Figure 3A:
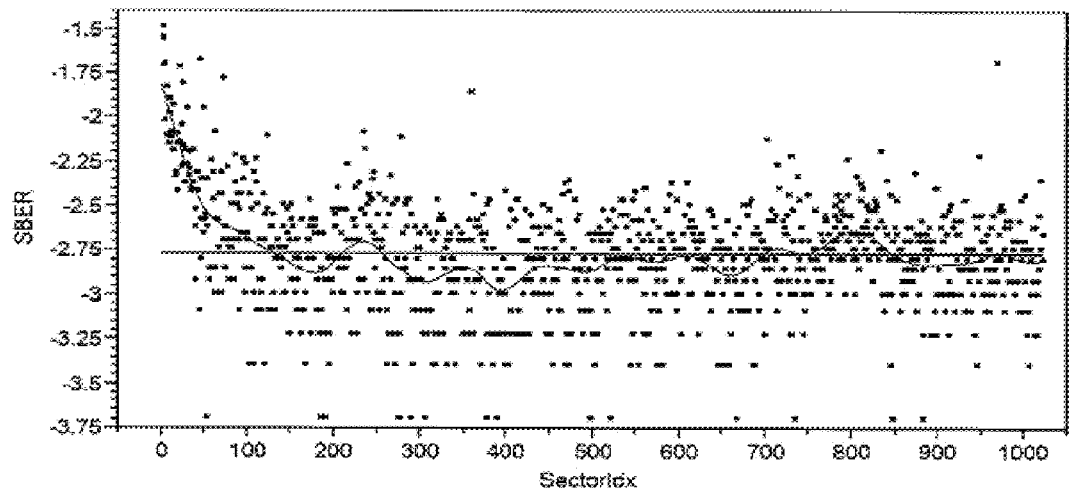
FIG. 3A is a graph of bit error rates illustrating effects of slider heating.

In reference now to FIG. 3A, a graph shows an example of how the recording process may change as a result of HAMR heating. The graph in FIG. 3A shows the bit error rate (BER) for 1011 consecutive sectors. For the first 50 sectors the BER improves until it reaches the steady state value of −2.75. This is due to the thermal effects of the laser. During the first 50 sectors, the spacing between the NFT and the media is being reduced because the head is running hotter. As the record head comes into thermal equilibrium, the head flies closer to the media and the performance improves.

Figure 3B:
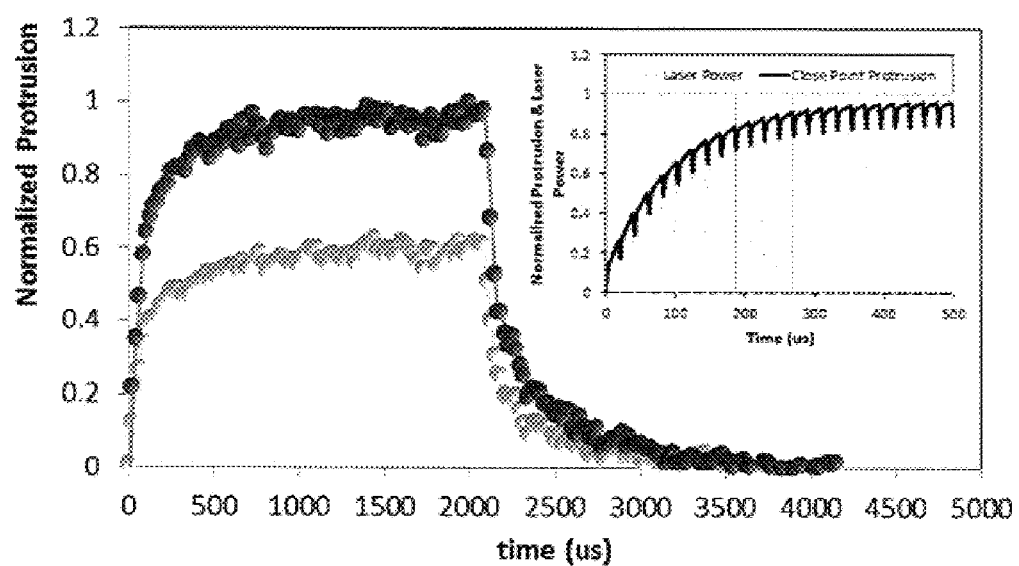
FIG. 3B is a graph illustrating heat induced protrusion in a slider according to example embodiments.

In FIG. 3B, a graph shows an in-drive HMS measurement of the clearance between the media and the head with an accompanying graph of normalized protrusion and laser power. It takes nearly 1000 μs for this system to reach steady state. This represents an issue that may need to be addressed in the drive, because 1000 μs may represent hundreds of sectors that may need to be compensated for. In addition, the compensation method must also account for situations where smaller sector bursts are written. For example, the thermal expansion must compensate for situations where 100 sectors are written, followed by 50 sectors of not writing and then another 200 sectors being written. In this example, during the 50 sectors of not writing, the head is cooling but has not reached room temperature before the 200 sectors start up again.

In order to compensate for these heating effects, a special heater may be used to mimic the heating from the laser. The heating effect from the laser may be due to a number of components of the optical pathway (e.g., waveguides, NFT) acting in combination, or one of the components may dominate. If the heating is found to come from more than one source, multiple heaters (e.g., different locations, time constants, thermal power, etc.) may be used if one heater cannot be designed to compensate all the effects. The heater or heaters could have one or more of the same thermal characteristics as heat generated by the optical pathway, or at least a portion of the heat or heat profile that is being compensated for. The thermal characteristics may include, but are not limited to, an amount of thermal energy or power, thermal time constant, location, thermal transfer paths to sinks or sources (conductive, convective and/or radiative), and shape of a heat profile of at least part of the heated optical pathway.

As described herein, a HAMR recording device may define a write/recording mode as a signal that is activated when writing occurs and/or is expected to occur. The laser and write pole may be deactivated in write mode, such as when passing over servo gates or sectors that are not to be written. In such a case, a compensating heater can be activated to simulate the effects of the laser heating when the laser is off, thereby maintaining thermal equilibrium. This is shown in FIG. 4A, which illustrates a signal timing diagram according to an example embodiment.

Figure 4A:
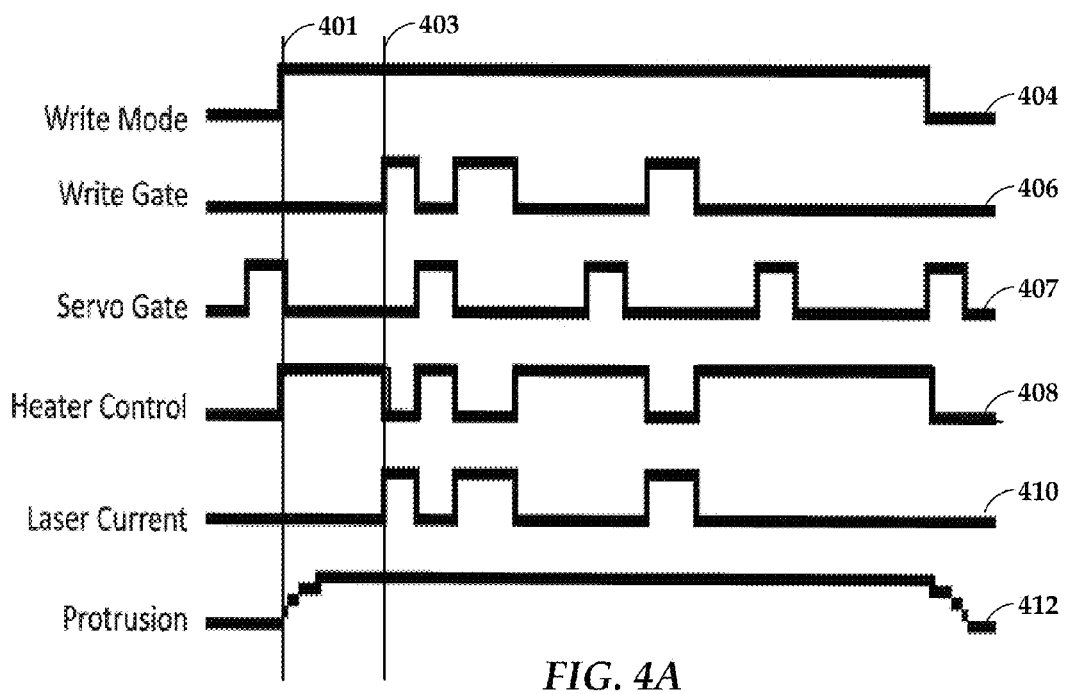
FIGS. 4A and 4B are timing diagrams illustrating heater control scenarios according to example embodiments.

Looking at the diagram in FIG. 4A from left to right, at some time 401 defined by the drive firmware the drive goes into write mode, which is indicated by signal 404. In this mode the drive is not writing data but it is preparing to write, e.g., waiting for the affected sectors to be under the write element. The heater control (signal 408) engages and the protrusion begins as is shown by trace 412 in the figure. Once the protrusion has reached equilibrium, the write gate is enabled (e.g., as indicated by trace 406 at time 403) and the laser is turned on (e.g., as indicated by trace 410 at time 403).

As seen by comparing traces 408 and 410, whenever the laser is on during recording mode, the heater control is off. While there may configurations where both the laser and heater are contemporaneously active during the recording mode (e.g., where the compensating heater also performs active HMS control), in this example the laser and heater are not contemporaneously active during the recording mode. Since the heating/cooling from the laser is exactly or approximately compensated by the cooling/heating of the heater, the protrusion 412 maintains equilibrium (and thereby stabilizes head-media spacing) after time 403. Also shown in the figure is the servo gate (trace 407). When a servo operation is being performed the laser is off and the heater is on. When the drive leaves write mode and goes back into read mode or standby mode, the heater is turned off.

In the diagram of FIG. 4A, it may be assumed that the thermal characteristics of the laser and compensating heater are reasonably well-matched, so that the heater control signal 408 can be an inverse of the laser current signal any time after write is enabled, e.g. while write mode signal 404 is asserted high. If one of the thermal characteristics of the laser and compensating heater are not matched, then the control signals can be adjusted to maintain a more steady thermal equilibrium. An example of this is shown in the timing diagram of FIG. 4B.

Figure 4B:
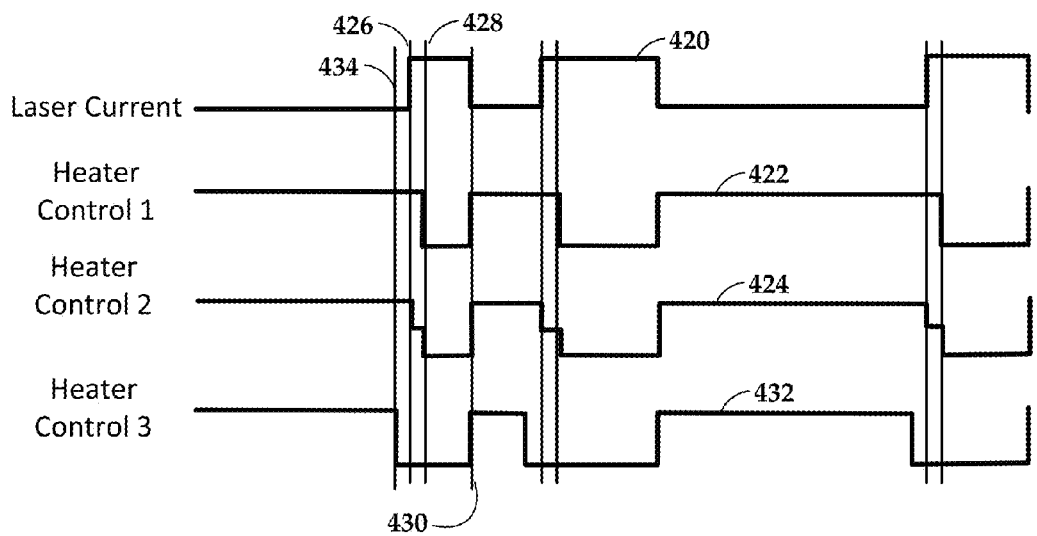

In FIG. 4B, trace 420 represents a laser current signal similar to signal 410 in FIG. 4A. In this case, although the heater may be matched to, e.g., an output power, shape, etc., of the laser, it may be the case that the heater has a different time constant, such as where the laser diode is slower to come up to operating temperature than it takes for the compensating heater to cool from operating temperature. As such, if the heater current were disengaged at the same time the laser current was engaged, there might be a detectable dip in temperature, which would cause a momentary change in protrusion. In this example, two heater traces 422, 424 show how the control signals can prevent this type of protrusion change by overlapping heater activation with laser activation.

As indicated by, e.g., period between times 426 and 428, the compensating heater is activated during a period when the laser on and delivering energy to the magnetic recording medium via the optical pathway. In trace 422, the heater is on at full power between times 426 and 428. In trace 424, the heater is on at less than full power between times 426 and 428. A similar overlap may occur (instead of or in combination with the previously describe overlap) after the laser is deactivated, e.g., just before time 430. For example, if the laser was faster to cool down that the laser was to heat up, then the heater could be engaged (either at partial or full power) before time 430.

In other examples, there may be a "gap" period where neither the laser or compensating heater are activated. This is indicated by trace 432. At time 434, when the laser current has not yet been activated, the heater current has been deactivated. This may be a zero-power-level deactivation as shown or stepped/intermediate power level similar to the transitions shown in track 424. This type of transition may be used, e.g., where the heater is slow to cool from operating temperature and the laser comes up to operating temperature quickly. Similar adjustments may be made when the laser is turned off, e.g., time 430, such that there is a delay after time 430 before the heater is turned back on.

Although the example compensation techniques shown in FIG. 4B are described as being used where there is a mismatch between thermal time constants, the technique may be applied to correct for a number of mismatched thermal characteristics. For example, even if the time constants of the heater and laser are well-matched, other thermal factors (e.g., shape of heater or optical path, separation distance, different intervening thermal path materials) may case protrusion to fluctuate when transitioning between the heater being activated and the laser being deactivated, and vice versa. The overlap and/or gap techniques shown in FIG. 4B can be used singly or in combination to compensate for any mismatch in thermal characteristics between the laser, optical pathway, and/or heater. These overlaps and/or gaps may be applied in any combination during one or both of laser activation and deactivation.

Figure 5A:
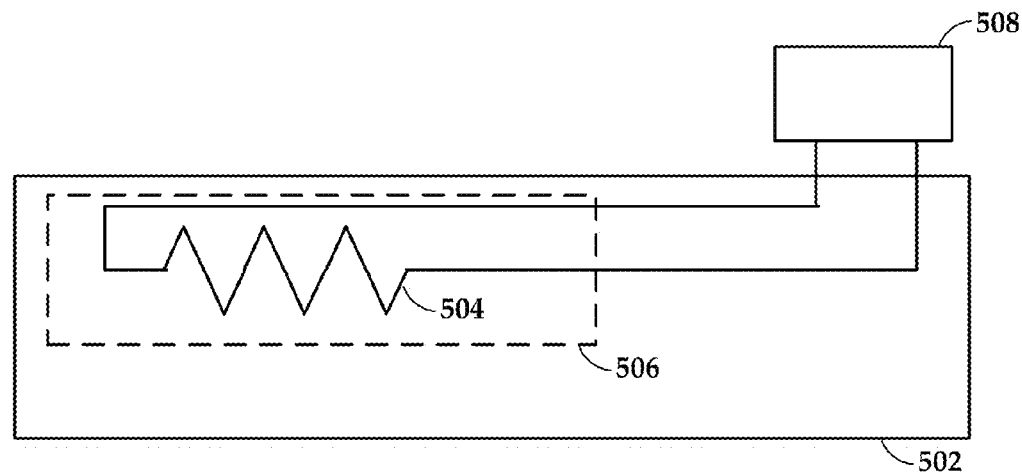
FIGS. 5A, 5B, and 6A are schematic diagrams illustrating compensating heater placement according to example embodiments.
Figure 5B:
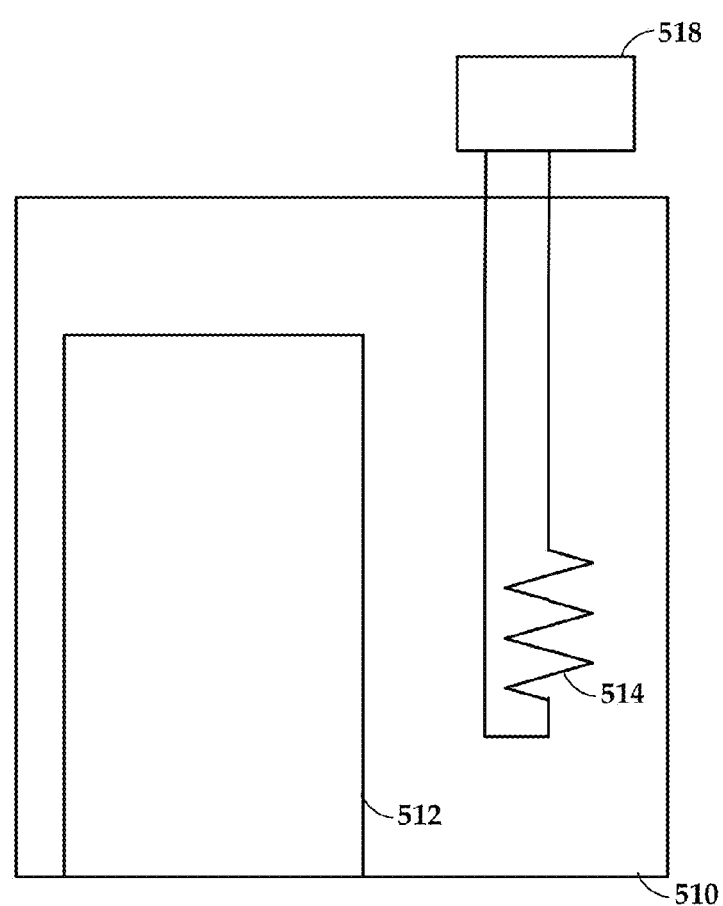

While an optical path may have a number of thermal hotspots, a heater may be chosen to compensate for a dominant source of heat. If the dominate source of heating is from the laser, a resistive element can be placed either under the laser for the LIS case or on the laser carrier or submount for the LOS case. This is shown in FIGS. 5A and 5B. In FIG. 5A, a view from the trailing edge of slider 502 shows a resistive heater 504 located within cavity 506 where the laser is mounted (see, e.g., laser-in-slider configuration in FIG. 1A). In FIG. 5B, a resistive heater 514 is located proximate laser 512 on carrier 510 (see, e.g., laser-on-slider configuration in FIG. 1A). The heater 514 may also be placed under the laser 512. It will be appreciated that other types of heaters may be utilized besides a resistive heater, such as an inductive heater, optical heater, etc. The illustrated heaters 504, 514 are coupled to respective controller circuits 508, 518 as known in the art.

Figure 6A:
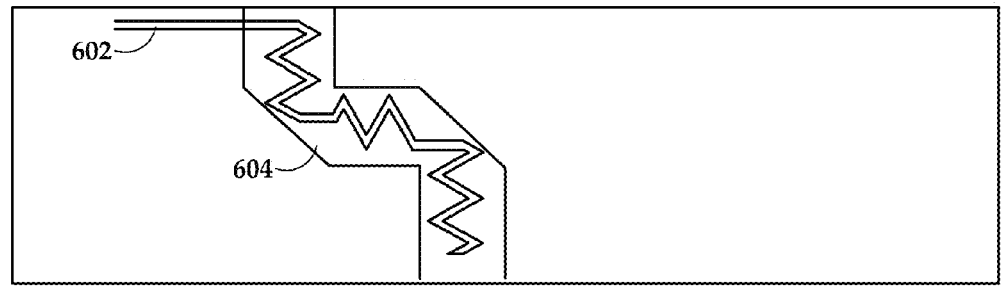

If the dominate source of heating is from losses in the light path, a heater can be placed under the light path as is shown in FIG. 6A. A heater 602 is placed on or near a waveguide 604 and/or other optical component (e.g., mirror, collimator, coupler, decoupler, mode shifter, etc.) that generates significant heat. A heater can also be placed above the light path or in close proximity to it. In some instances, the heater can even be part of the light path. For example, as shown in FIG. 6B, a solid-immersion mirror (SIM) design includes an integrated heater according to an example embodiment.

Figure 6B:
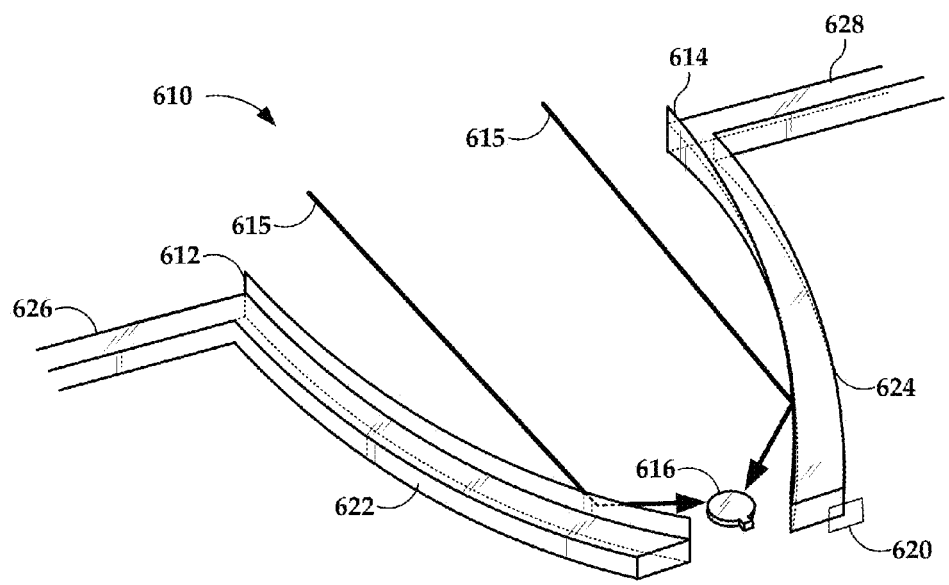
FIG. 6B is an isometric view of a heater integrated with a solid immersion mirror according to an example embodiment.

In FIG. 6B, a SIM 610 includes two sidewalls 612, 614 formed of a reflective material (e.g., Au, Ag). The sidewalls 612, 614 have a shape (e.g., parabolic) that focuses light 615 onto a near-field transducer 616, which is located at a focus of the SIM 610 and proximate a media-facing surface 620 (e.g., air bearing surface). The areas within (and outside) the sidewalls 612, 614 may be filled with a dielectric material through which the light 615 can propagate. In this example, regions 622, 624 near the sidewalls 612 are filled with a resistive heater material, and conductive leads 626, 628 are electrically coupled to the regions 622, 624. The leads 626, 628 can terminate outside a slider that houses the SIM 610 and NFT 616. From there, the leads 626, 628 can be coupled to a controller that activates the heating regions 622, 624. In another arrangement, the sidewalls 612, 614 themselves may be coupled to the leads 626, 628, in which case the sidewalls can have the dual purpose of being a reflector and a heater, either alone or in combination with other regions 622, 624.

If the dominate source of heating is the NFT, a heater similar to what is used for the writer and reader heaters can be used. Reader and writer heaters may be provided for active control of the HMS, e.g., a feedback loop include an HMS sensor and HMS adjusting heater. In some instances it may be possible to design the reader or writer heater to have the same thermal profile and time constant as NFT heating. In such a case, the reader or writer heater can perform two functions—controlling the HMS and compensating for protrusion from laser heating during write mode. In this case a multilevel heater controller may be utilized, because a different heater current may be required when the laser is on and off.

Figure 7:
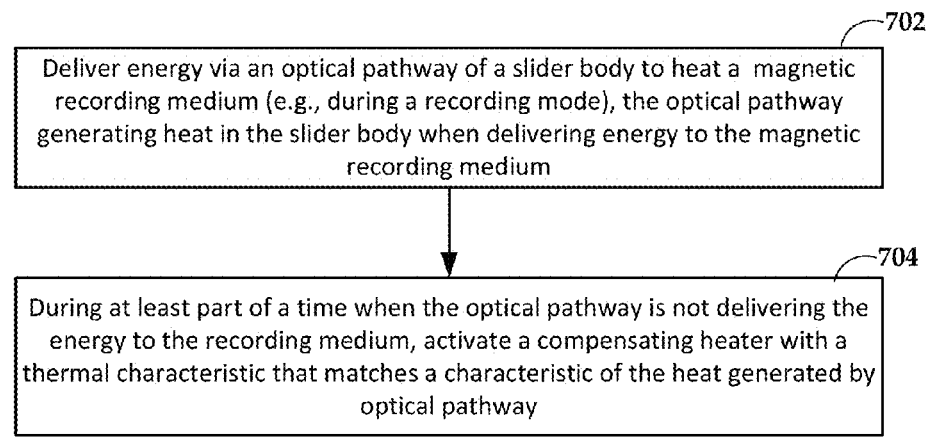
FIGS. 7 and 8 are flowcharts illustrating processes/methods according to example embodiments.

In FIG. 7, a flowchart illustrates a method according to an example embodiment. The method involves delivering 704 energy via an optical pathway of a slider body to heat a magnetic recording medium (e.g., HAMR media). The optical pathway generates heat in the slider body when delivering energy to the magnetic recording medium. A compensating heater with a thermal characteristic that matches a thermal characteristic of the optical pathway is activated 704 when the optical pathway is not delivering the energy to the magnetic recording medium.

Figure 8:
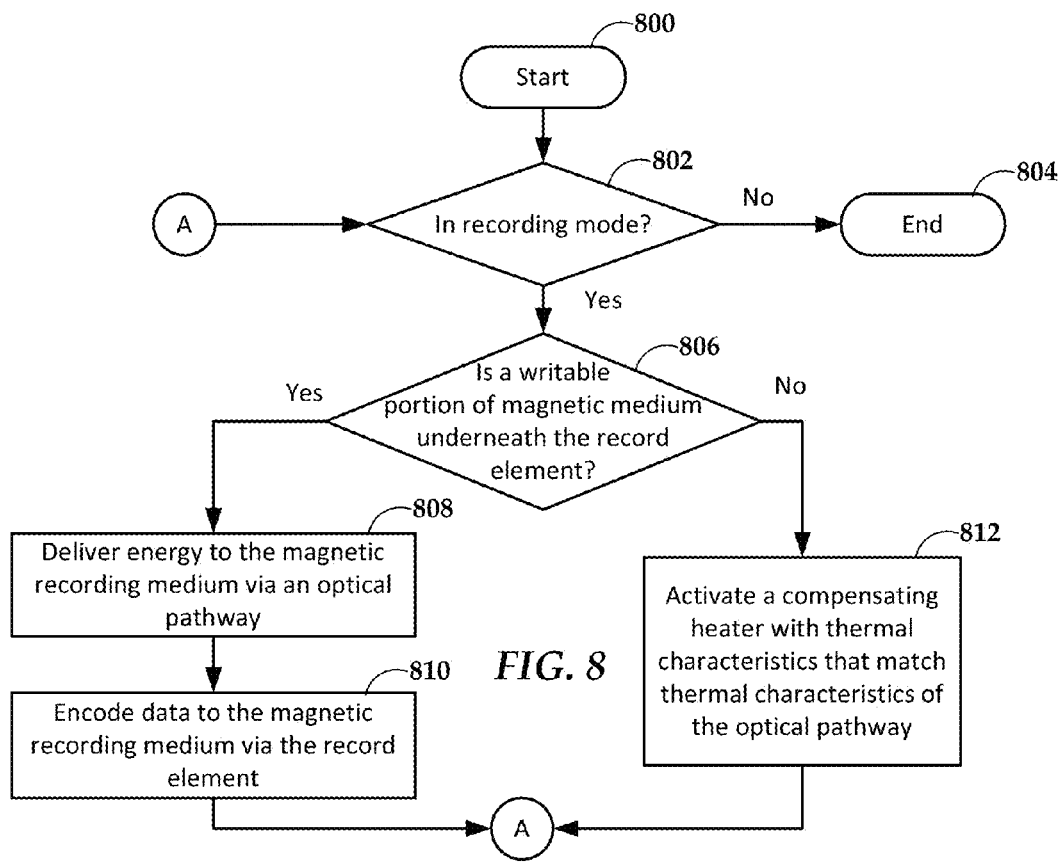

In FIG. 8, a flowchart illustrates another method according to an example embodiment. As shown here, this method may be entered at regular intervals via block 800, and exit immediately at block 804 if it is determined at block 802 that the apparatus is not in a recording mode. It will be understood that this type of operation is for purposes of illustration, and similar result may be obtain by performing the illustrated operations in response to events, e.g., in response to signals as shown in FIGS. 4A and/or 4B.

While in the recording mode, block 806 determines whether a region of a magnetic recording medium that is to be written is currently under a recording element (e.g., record head). If so, energy is delivered 808 to the recording medium via an optical pathway, and data is encoded 810 to the magnetic recording medium via the record element. If it is determined at block 806 that a region of a magnetic recording medium that is to be written is not currently under a recording element, a compensating heater is activated 812. The compensating heater has one or more thermal characteristics that match characteristics of heat generated by the optical pathway. The thermal characteristics may include, but are not limited to, an amount of thermal energy, thermal time constant, location, and shape of a heat profile of at least part of the heated optical pathway.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
    an optical pathway comprising one or more of a waveguide, a laser mounted to a slider body, a mirror, and a near-field transducer configured to deliver energy to heat a magnetic recording medium via the slider body, wherein the optical pathway generates heat in the slider body when delivering energy to the magnetic recording medium; and
    a compensating heater with a thermal characteristic that matches a characteristics of the heat generated by the optical pathway, the compensating heater configured to stabilize a spacing between the slider body and the magnetic recording medium, wherein the compensating heater is activated at least part of a time when the optical pathway is not delivering the energy to the magnetic recording medium.

2. The apparatus of claim 1, further comprising a write element configured to encode data to the magnetic recording medium as the magnetic recording medium is being heated.

3. The apparatus of claim 1, wherein the optical pathway delivers the energy during part of a recording mode of the apparatus, and wherein the compensating heater is deactivated when not in the recording mode.

4. The apparatus of claim 1, wherein the thermal characteristic of the optical pathway comprises one or more of thermal energy, thermal time constant, location, and shape.

5. The apparatus of claim 1, wherein, to compensate for a mismatch between another thermal characteristic of the compensating heater and the heat generated by the optical pathway, the compensating heater is activated during a period when the optical pathway is delivering the energy to the magnetic recording medium.

6. The apparatus of claim 1, wherein, to compensate for a mismatch between another thermal characteristic of the compensating heater and the heat generated by the optical pathway, the compensating heater is deactivated during a period when the optical pathway is not delivering the energy to the magnetic recording medium.

7. The apparatus of claim 1, wherein the compensating heater comprises a sidewall of a solid-immersion mirror.

8. A method comprising:
    delivering energy via an optical pathway that comprises one or more of a waveguide, a laser mounted to a slider body, a mirror, and a near-field transducer to heat a magnetic recording medium of an apparatus, wherein the optical pathway generates heat in the slider body when delivering the energy to the magnetic recording medium; and
    activating, at least part of a time when the optical pathway is not delivering the energy to the magnetic recording medium, a compensating heater with a thermal characteristic that matches a characteristic of the optical pathway, wherein activating the compensating heater stabilizes a spacing between the slider body and the magnetic recording medium.

9. The method of claim 8, further comprising causing the apparatus to enter a recording mode, wherein the optical pathway delivers the energy to the magnetic recording medium during part of the recording mode, and wherein the compensating heater is deactivated when the apparatus is not the recording mode.

10. The method of claim 9, wherein the compensating heater and the energy are not contemporaneously active during the recording mode.

11. The method of claim 8, further comprising encoding data to the magnetic recording medium via a write element as the magnetic recording medium is being heated.

12. The method of claim 8, wherein the thermal characteristic of the optical pathway comprises one or more of thermal energy, thermal time constant, location, and shape.

13. An apparatus comprising:
a slider body comprising an optical pathway;
a laser coupled to deliver energy to heat a magnetic recording medium via the optical pathway, wherein the optical pathway generates heat in the slider body when delivering the energy to the magnetic recording medium;
a compensating heater with a thermal characteristic that matches a characteristic of the heat generated by the optical pathway, the compensating heater configured to stabilize a spacing between the slider body and the magnetic recording medium; and
a controller coupled to the laser and the compensating heater, the controller configured to activate the compensating heater at least part of a time when the laser is not activated.

14. The apparatus of claim 13, wherein the controller is further configured to deactivate the compensating heater when the laser is activated.

15. The apparatus of claim 14, wherein the controller is configured to initiate a recording mode during which the compensating heater and the laser are not contemporaneously active.

16. The apparatus of claim 1, wherein at least a portion of the compensating heater is disposed in the slider body on or in close proximity to the optical pathway that extends along the slider body.

17. The method of claim 8, wherein at least a portion of the compensating heater is disposed in the slider body on or in close proximity to the optical pathway that extends along the slider body.

18. The apparatus of claim 13, wherein at least a portion of the compensating heater is disposed in the slider body on or in close proximity to the optical pathway that extends along the slider body.

* * * * *